(12) United States Patent
Suematsu et al.

(10) Patent No.: US 7,025,946 B2
(45) Date of Patent: Apr. 11, 2006

(54) METHOD FOR PRODUCING SOFT MAGNETIC HEXAGONAL FERRITE SINTERED MATERIAL AND SOFT MAGNETIC HEXAGONAL FERRITE SINTERED MATERIAL

(75) Inventors: Yutaka Suematsu, Nagoya (JP); Toru Matsuzaki, Nagoya (JP); Yasuo Kondo, Nagoya (JP); Hideaki Matsubara, Nagoya (JP); Hiroshi Nomura, Nagoya (JP)

(73) Assignees: Kitigawa Industries Co., Ltd., Nagoya (JP); Japan Fine Ceramics Center, Nagoya (JP)

( * ) Notice: Subject to any disclaimer, the term of this patent is extended or adjusted under 35 U.S.C. 154(b) by 578 days.

(21) Appl. No.: 10/225,647

(22) Filed: Aug. 21, 2002

(65) Prior Publication Data
US 2003/0038274 A1    Feb. 27, 2003

(30) Foreign Application Priority Data
Aug. 22, 2001  (JP) .............................. 2001-251676

(51) Int. Cl.
*C04B 35/26* (2006.01)

(52) U.S. Cl. .............................. 423/594.1; 423/594.2; 252/62.63

(58) Field of Classification Search ............. 423/591.1, 423/594.2; 252/62.63
See application file for complete search history.

(56) References Cited

U.S. PATENT DOCUMENTS 4,886,714 A * 12/1989 Torii et al. ................ 428/842.8
5,232,617 A    8/1993 Sarda et al. ............... 252/62.6

FOREIGN PATENT DOCUMENTS

| EP | 0 547 620 A1 | 6/1993 |
| FR | 2 785 280 | 5/2000 |
| JP | 9-124322 | 5/1997 |
| JP | 09124322 | 5/1997 |
| JP | 2717815 | 11/1997 |

* cited by examiner

*Primary Examiner*—Steven Bos
(74) *Attorney, Agent, or Firm*—Davis & Bujold, P.L.L.C.

(57) ABSTRACT

A soft hexagonal ferrite sintered material includes crystal particles of M-type hexagonal ferrite corresponding to a general chemical formula $MFe_{12}O_{19}$ wherein M is at least one element selected from the group consisting of Ba, Sr and Pb. Crystal particles having particle diameters of 5 μm to 100 μm are extracted from a sintered material produced from a precursor powder mixture. The extracted particles as seed crystals are mixed with a calcined powder comprising fine crystals having the above composition and particle diameters of 0.5 μm to 3 μm, then is sintered until the intended particle growth of the crystal particles in the sintered material is achieved to give an average particle diameter of 30 μm to 500 μm.

5 Claims, 2 Drawing Sheets

METHOD FOR PRODUCING SOFT MAGNETIC HEXAGONAL FERRITE SINTERED MATERIAL AND SOFT MAGNETIC HEXAGONAL FERRITE SINTERED MATERIAL

BACKGROUND OF THE INVENTION (i) Field of the Invention

The present invention relates to a method for producing a soft magnetic hexagonal ferrite sintered material and to a soft magnetic hexagonal ferrite sintered material produced by the method.

(ii) Description of the Related Art

Conventional techniques to produce a hexagonal ferrite powder of flat particles to be used as a raw material for soft magnetic hexagonal ferrite sintered material include, for example, both hydrothermal methods (see Publication of Japanese. Unexamined Patent Application No. 9-124322) and flux methods (see Publication of Japanese Patent No. 2717815).

However, the hydrothermal methods have a disadvantage in that it is difficult to obtain crystal particles having a relatively large size, for example, in the range of several dozen µm, by the hydrothermal methods. Another disadvantage is that the raw composite required to obtain crystal particles for use in the hydrothermal method is so expensive and so difficult to handle that industrial production of the hexagonal ferrite powder of flat particles by the methods is too costly.

On the other hand, the flux methods have a disadvantage in that it is difficult to make the crystal particles grow to a sufficient extent, although it is possible to obtain crystal particles that are larger in size than can be obtained in the hydrothermal methods. Further problems or disadvantages of the flux methods are that the flux component is prone to mixing with the other components and to appear as impurities. Also, components having poor chemistry compatibility with the flux component cannot be added to the mixtures of components.

The object of the present invention, which is to solve the above described problems, is to provide a method for producing a soft hexagonal ferrite sintered material which gives crystal particles that are larger in size than can be obtained in the methods of the prior art, and to produce a soft hexagonal ferrite sintered material which has a structure comprised of such larger crystal particles and wherein the crystal particles are oriented in a specific direction.

SUMMARY OF THE INVENTION

The above object is attained by a method for producing a soft magnetic hexagonal ferrite sintered material comprised of crystal particles of M-type hexagonal ferrite corresponding to a general chemical formula $MFe_{12}O_{19}$, wherein M is comprised of at least one element selected from the group consisting of Ba, Sr and Pb. The method comprises the steps of (a) preparing an intermediate M-type hexagonal ferrite sintered material from a precursor powder mixture having the same composition as the M-type hexagonal ferrite, (b) decomposing the intermediate sintered material by acid treating the intermediate sintered material to dissolve the particle boundaries therein, thereby obtaining a powder of flat particles of M-type hexagonal ferrite, (c) extracting from the powder of flat particles the particles having particle diameters of 5 µm to 100 µm, the extracted particles to be used as seed crystals, (d) preparing a mixture of the seed crystals and a fine powder of M-type hexagonal ferrite having smaller diameters than those of the seed crystals, and (e) orienting the seed crystals in the mixture and subsequently sintering the mixture until the seed crystals grow to have an average particle diameter of 30 µm to 500 µm.

In the method of the present invention, crystal particles having particle diameters of 5 µm to 10 µm are extracted from an intermediate sintered material, which has been produced from a precursor powder mixture and the extracted crystal particles are used as seed crystals. A mixture of the seed crystals and a fine powder of M-type hexagonal ferrite is sintered until the crystal particles in the resulting sintered material have grown to provide an average particle diameter of 30 µm to 500 µm. As such, the crystal particles in the resulting sintered material are larger in particle diameter than the crystal particles obtainable by the methods of the prior art, wherein a hexagonal ferrite sintered material is produced just by sintering fine powder of M-type hexagonal ferrite without using seed crystals. Thus a hexagonal ferrite sintered material having superior soft magnetic properties and having a stronger magnetic anisotropy and a higher permeability in a specific direction than conventional products is obtained In the above described method for producing a soft magnetic hexagonal ferrite sintered material, the fine powder of M-type hexagonal ferrite having smaller particle diameters than the seed crystals is preferably comprised of fine crystals having particle diameters of 0.5 µm to 3 µm. This facilitates particle growth of the seed crystals due to the difference in particle diameter between the seed crystals and the fine crystals.

To orient the seed crystals in the above mentioned mixture, the mixture may be rolled to form a sheet of the mixture. A plurality of the sheets may then, for example, be stacked in layers to form, for a laminate.

In this case, and for example, the mixture is dispersed in a resin binder to obtain a slurry mixture, which may then be rolled with a rolling means, such as a roll press, to form a green sheet. During the rolling process, the seed crystals are mechanically oriented within the green sheet. Alternatively, the seed crystals may be oriented within the formed sheet by extrusion molding, or by tape casting or doctor blade process.

Since the flat seed crystals are oriented in each green sheet, as described above, when a laminate is formed by stacking a plurality of such sheets in layer, the seed crystals included in the entire laminate can be oriented in the same manner. The desired sintered material may then be obtained by degreasing and sintering the laminate.

The acid treatment of the intermediate sintered material is performed using an acid selected from the group including hydrochloric acid, nitric acid, sulfuric acid and any mixture of acids thereof. The mixed acid may be aqua regia or inverse aqua regia, for example, and also may be a mixture of two or more of the above acids at another mixing ratio. Among these acids, hydrochloric acid or a mixed acid containing hydrochloric acid is preferred.

By the acid treatment with these acids, particle boundaries in the intermediate sintered material are dissolved so the desired crystal particles can then be extracted. The period during which the material is treated with the acid should not be excessively long because the acid causes dissolution not only of the particle boundaries but also of the crystal particles themselves. The acid treatment should therefore be stopped when an appropriate time has elapsed. The period of the acid treatment and the timing for stopping the acid treatment varies depending on a combination of conditions, such as the kind of acid, the temperature and the concentration of acid, and may be readily and easily determined experimentally, and without undue experimentation, for any given conditions, as discussed above.

During the acid treatment, one or more auxiliary processes may be performed upon the intermediate sintered material, wherein the auxiliary processes are selected from the group including heat treatment, ultrasonication and dropping of a pro-oxidant, that is, the addition of a pro-oxidant during the acid treatment. In the case of dropping of a pro-oxidant, and for example, hydrogen peroxide solution may be employed as the pro-oxidant.

These auxiliary processes promote dissolution of the particle boundaries between the crystal particles, so that the desired crystal particles can be extracted more rapidly from the intermediate sintered material.

The method for producing a soft magnetic hexagonal ferrite sintered material described above can be performed with minimum of the equipment typically used for common powder metallurgical process and the equipment typically used for treating chemicals and for obtaining the seed crystals from the intermediate sintered material. Accordingly, further apparatus or equipment, such as is typically required for hydrothermal methods or coprecipitation methods, is not necessary in the present method. Furthermore, hexagonal ferrite can be produced by multi-element substitution, while such ferrites are difficult to synthesize by hydrothermal methods or coprecipitation methods.

In another aspect of the present invention, there is provided a soft magnetic hexagonal ferrite sintered material, comprising of crystal particles of M-type hexagonal ferrite corresponding to a general chemical formula $MFe_{12}O_{19}$, wherein M is at least one element selected from the group consisting of Ba, Sr and Pb, the crystal particles including flat particles having an average particle diameter of 30 μm to 500 μm and an average particle thickness of 6 μm to 100 μm wherein among relatively large particles having particle diameters of 30 μm or more, 60% or more in number of the relatively large articles are oriented at a relative angle of −20° to 20° with respect to the state of 0°, which is parallel to a given reference plane.

In the soft magnetic hexagonal ferrite sintered material, the crystal particles are produced by preparing crystal particles having particle diameters of 5 μm to 100 μm as seed crystals, preparing a mixture of the seed crystals and fine powder of M-type hexagonal ferrite having smaller particle diameters compared with the seed crystals and sintering the mixture to provide particle growth of the seed crystals during sintering process. The fine powder of M-type hexagonal ferrite having smaller particle diameters than the seed crystals preferably comprises fine crystals having particle diameters of 0.5 μm to 3 μm. This facilitates particle growth of the seed crystals due to the difference in particle diameter between the seed crystals and the fine crystals.

The hexagonal ferrite sintered material produced as above has superior soft magnetic properties, having a stronger magnetic anisotropy and a higher permeability in a specific direction than the prior art products. Therefore, it may be a suitable magnetic material for use in noise filters, wave absorbers, and the like

BRIEF DESCRIPTION OF THE DRAWINGS

A preferred embodiment according to the present invention will now be described with reference to the drawings in which.

DETAILED DESCRIPTION OF PREFERRED EMBODIMENT

Figure 1:
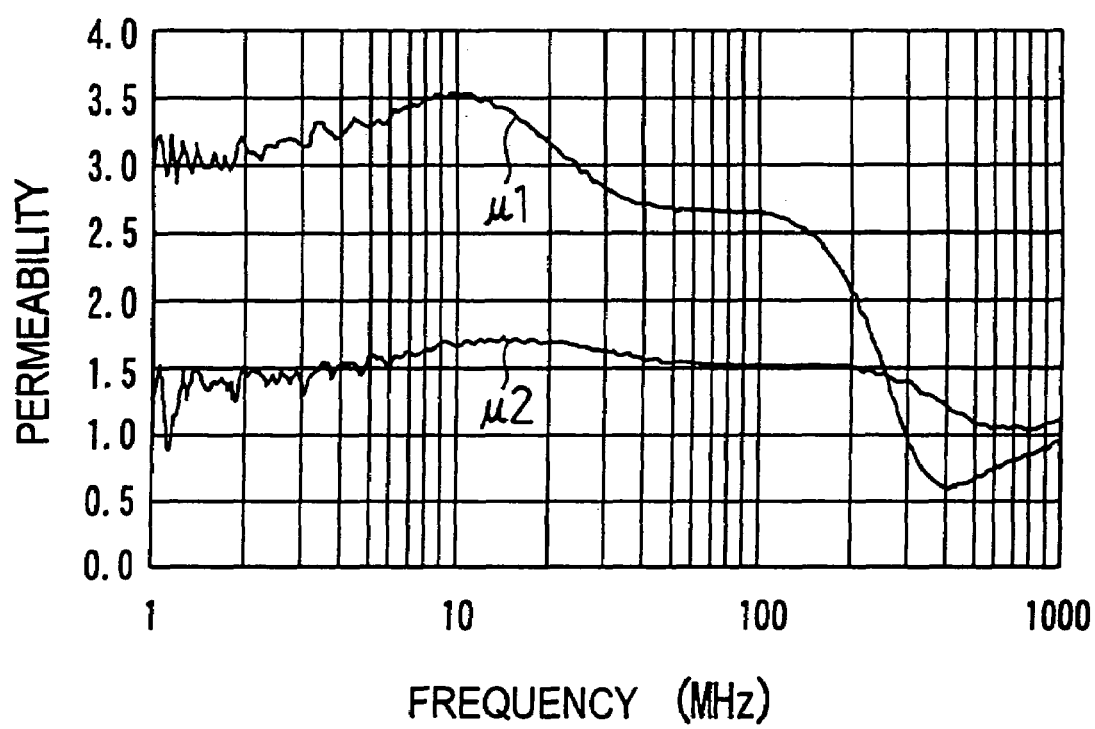
FIG. 1 is a graph, showing the relationship between the direction of orientation of crystal particles and the permeability.

Preferred Embodiment (1) Producing of a Hexagonal Ferrite Sintered Material:

Precursor powders of $BaCo_3$ and $Fe_2O_3$ are weighed out so as to give a molar ratio of 1:6 and are mixed with water or alcohol by means of wet ball mill blending at 80 rpm for 24 hours or more and using a resin pot and balls. The mixture is then dried, so that the precursor powders may not be separated from each other, to obtain a precursor powder mixture Subsequently, the precursor powder mixture obtained from the blending process is calcined at a temperature of 900° C. to 1100° C., and is ground by means of ball mill grinding at 100 rpm for 48 hours or more and using a metal or high density ceramic pot and balls to obtain a calcined powder having particle diameters of about 0.5 to about 3 μm. The calcined powder is formed into pellets and the pelletized material is then sintered at a temperature of 1300° C. to obtain an intermediate sintered material.

The intermediate sintered material is then soaked in hydrochloric acid so that the intermediate sintered material is decomposed The hydrochloric acid is heated up to a temperature of 100° C. during the soaking process, and a pro-oxidant, such as hydrogen peroxide solution in the present embodiment, is dropped into the acid as an auxiliary process to promote the dissolution of particle boundaries. The powder obtained through the decomposition process contains particles of different diameters, and crystal particles having particle diameters of 5 μm to 100 μm and aspect ratios of particle diameter to particle thickness of about 2 to about 8 are selected and separated from the other particles to obtain seed crystals for the next step of the process Quantities of the seed crystals and of the calcined powder are then weighed out such that the seed crystals comprise 5% by weight of the total weight of the total quantity of powder materials, that is, of the total weight of the seed crystals plus the calcined powder. The weighed out quantities of seed crystals and calcined powder are then mixed by means of ball mill blending at 80 rpm for 24 hours or more. The mixed seed crystals and calcined powder are then mixed with a binder for ceramics, such as CERANDER from YUKEN INDUSTRY CO., LTD., so that the binder for ceramics comprises 20% by weight of the mixture of) binder, seed crystals and calcined powder. Distilled water is then added to the binder, seed crystals and calcined powder to obtain a slurry mixture wherein the water comprises 30% by weight of the binder, seed crystals and calcined powder.

The slurry mixture is then rolled with a roll press to form a green sheet having a thickness of 0.2 mm and two or more green sheets are stacked in layer to form a laminate After being sufficiently degreased at 500° C. the laminate is sintered at 1300° C. for a time sufficient to cause sufficient particle growth and thereby to obtain the desired hexagonal ferrite sintered material.

(2) Measurement of the Degree of Orientation of the Crystal Particles.

The hexagonal ferrite sintered material produced as described in (1) is mirror-polished with an abrasive on the sections parallel to the thickness direction of the formed green sheet Then, thermal etching is carried out at a temperature in the range of about 1000° C. to about 1100° C. in order to make the particle boundaries in the mirror-polished sections of the sintered material appear clearly.

The sections of the sintered material are observed with an electron microscope at several random points and the total number A of relatively large crystal particles having particle diameters of 30 μm or more after the particle growth are counted. Also, the number of oriented particles B among the above large crystal particles is counted, wherein an oriented particle means herein a particle having a relative inclination of smaller than + or −20 degrees with respect to a plane which is parallel to the formed green sheet, which is hereinafter referred to as the reference plane and corresponds to 0 degrees of inclination.

The degree of orientation is calculated based on the total number A and the number of oriented particles B in accordance with the following formula:

Degree of orientation $C(\%) = (B/A) \times 100$

Results of the above described process and tests show that the degree of orientation C is in the range of 70% at minimum and 82% on the average.

(3) Measurement of Frequency Characteristics of the Permeability:

After processing the hexagonal ferrite sintered material produced as described in (1) into a ring-shape, the permeability of the material may be measured, with the results shown in FIG. 1. The measurement apparatus used in this case is HP4291A impedance/material analyzer available from HEWLETT PACKARD. In FIG. 1, the permeability μ1 are measurement results when the thickness direction of the formed green sheet is parallel to the direction of the signal current during the measurements, and the permeability μ2 are measurement results when the thickness direction of the formed green sheet is perpendicular to the direction of the signal current.

The result shows that the permeability μ1 is twice or more the value of the permeability μ2 over a wide frequency range. Accordingly, once the direction of the external magnetic field is specified, an efficient soft magnetic property can be obtained.

EXAMPLE FOR COMPARISON

Precursor powders of $BaCo_3$ and $Fe_2O_3$ are weighed out so as to give a molar ratio of 1:6 and are mixed with water (or alcohol) in a resin pot and balls by means of wet ball mill blending at 80 rpm for 24 hours or more. Then, the mixture is dried, so that the precursor powders may not be separated from each other, and a precursor powder mixture is obtained.

Subsequently, the precursor powder mixture is calcined at a temperature of 900° C. to 1100° C., and is ground by means of ball mill grinding at 100 rpm for 48 hours or more, using a metal or high density ceramic pot and balls, to obtain a calcined powder having particle diameters of about 0.5 μm to about 3 μm.

After the calcined powder is mixed with 20% by weight of a binder for ceramics, such as CERANDER from YUKEN INDUSTRY CO., LTD., distilled water is added in the amount of 30% by weight to obtain a slurry mixture.

Figure 2:
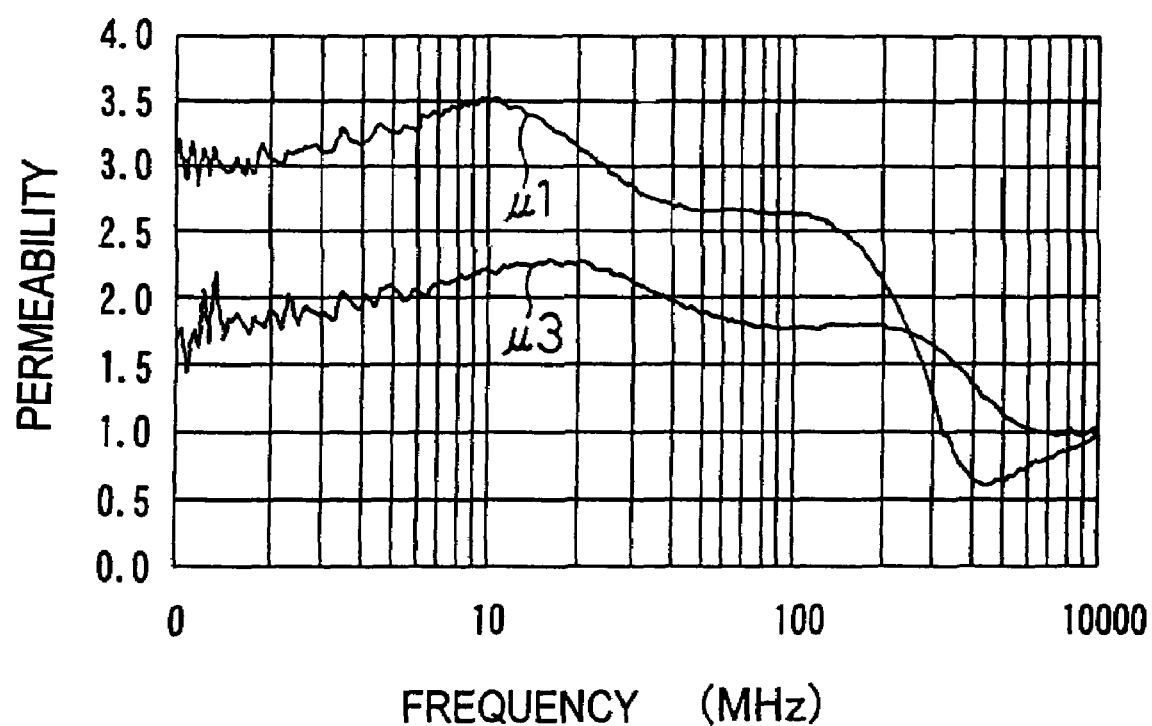
FIG. 2 is a graph, showing the relationship between the presence of seed crystals and the permeability.

The slurry mixture is then rolled with a roll press to form a green sheet having a thickness of 0.2 mm, and two or more green sheets are stacked in layers to form a laminate After being sufficiently degreased at 500° C., the laminate is sintered at 1300° C. to obtain a sintered material for a comparison sample. After processing the sintered material sample into a ring-shape, the permeability μ3 of the material is measured with the thickness direction of the formed green sheet parallel to the direction of the signal current during measurement The measurement result and the above mentioned permeability μ1 are shown together in FIG. 2

The result shows that the permeability μ1 of the sintered material in the present embodiment mostly provides higher values as compared with the permeability μ3 of the sintered comparison material As such, the sintered material produced using seed crystals provides a higher permeability as compared with the sintered material produced without using seed crystals, as well as an improved soft magnetic property Therefore, the use of the sintered material of the present embodiment facilitates, for example, miniaturization of a conventional magnetic device.

It is to be understood that the present invention should not be limited to the above described embodiment, but may be embodied in various forms. For example, although $BaCo_3$ is used as a precursor powder for producing a hexagonal ferrite sintered material in the present embodiment, $SrCO_3$ or $PbCO_3$, or inorganic compounds including Ba, Sr or Pb other than $BaCo_3$ may be employed to produce the desired sintered material, as in the present embodiment With respect to hexagonal ferrite having an easily magnetized surface, such as W-type, Y-type and Z-type, and in addition to M-type hexagonal ferrite, a sintered material may be produced by the same process as in the above embodiment Although the seed crystals are mixed in so as to make up 5% by weight of the total weight of the total powder materials in the above embodiment, the percentage is appropriately adjustable Particularly in the above embodiment, for example, it is adjustable within the range from about 1% by weight to about 20% by weight.

The thickness of the green sheet, which is approximately 0.2 mm in the embodiment, is also appropriately adjustable. However, since the degree of orientation has a tendency to become lower as the green sheet becomes thicker, the required degree of orientation should be taken into consideration when deciding the thickness of the green sheet.

The green sheet, which is formed with a roll press in the above embodiment, may be formed by extrusion molding or by doctor blade process. In these cases, it is necessary to select suitable seed crystals and mixing ratio for each forming process

What is claimed is:

1. A method for producing a soft magnetic hexagonal ferrite sintered material composed of crystal particles of M-type hexagonal ferrite corresponding to a general chemical formula $MFe_{12}O_{19}$ wherein M is at least one element selected from the group consisting of Ba, Sr and Pb, the method comprising the steps of:

preparing a M-type hexagonal intermediate ferrite sintered material from a precursor powder mixture having a general chemical formula $MFe_{12}O_{19}$ where M is the at least one element selected from the group consisting of Ba, Sr and Pb;

decomposing the intermediate sintered material by acid treating the intermediate sintered material to dissolve particle boundaries therein, thereby obtaining powder of flat particles of M-type hexagonal ferrite;

extracting powder having particle diameters of 5 μm to 100 μm to be used as seed crystals from the powder of flat particles;

preparing a mixture of the seed crystals and fine powder of M-type hexagonal ferrite having particle diameters of less than 5 μm; and orienting the seed crystals in the mixture and subsequently sintering the mixture until the seed crystals grow to have an average particle diameter of 30 μm to 500 μm.

2. The method for producing a soft magnetic hexagonal ferrite sintered material according to claim 1, wherein the mixing ratio of the seed crystals in the mixture is 3% by weight to 20% weight seed crystals, and the fine powder of M-type hexagonal ferrite includes fine crystals having particle diameters of 0.5 μm to 3 μm.

3. The method for producing a soft magnetic hexagonal ferrite sintered material according to claim 1, further comprising the steps of:

rolling the mixture to form a sheet of the mixture; and stacking a plurality of the sheets in layers, thereby orienting the seed crystals in the layers.

4. The method for producing a soft magnetic hexagonal ferrite sintered material according to claim 1, wherein the intermediate sintered material is acid treated with an acid selected from the group consisting of hydrochloric acid, nitric acid, sulfuric acid, and a mixture thereof.

5. The method for producing a soft magnetic hexagonal ferrite sintered material according to claim 1, wherein at least one auxiliary process selected from the group consisting of heat treatment, ultrasonication and adding a pro-oxidant is performed to the intermediate sintered material during the process of acid treating the intermediate sintered material.

* * * * *